United States Patent Office 3,048,602
Patented Aug. 7, 1962

3,048,602
16,16-DIFLUOROESTRATRIENES AND INTERMEDIATES RELATING THERETO
Cecil H. Robinson, Cedar Grove, N.J., assignor to Schering Corporation, Bloomfield, N.J., a corporation of New Jersey
No Drawing. Filed Feb. 5, 1962, Ser. No. 171,275
1 Claim. (Cl. 260—397.1)

This invention relates to a new group of therapeutically active steroids. More specifically, this invention relates to novel 16,16-difluoroestratrienes. In particular, my invention encompasses 16,16-difluoro derivatives of estrone, estradiol, 17α-alkylestradiol and 17α-ethinylestradiol. Also included within the scope of my invention are the esters and 3-lower alkyl ethers of the aforementioned 16,16-difluoroestratrienes as well as novel intermediates used in the preparation thereof.

My novel 16,16-difluoroestratrienes have the following general formula:

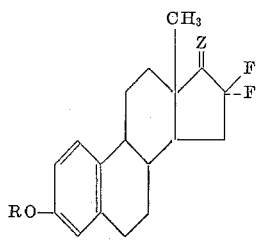

wherein Z is a member of the group consisting of O, (H, βOR'), (α-lower alkyl, βOR'), (α-lower alkenyl, βOR') and (α-lower alkynyl, βOR') wherein R' is a member of the group consisting of H and an acyl radical of an acid of the group consisting of carboxylic acids containing up to eight carbon atoms, sulfate and phosphate, and R is a member of the group consisting of hydrogen, lower alkyl and an acyl radical of an acid of the group consisting of carboxylic acids containing up to eight carbon atoms, sulfate and phosphate.

By the terms lower alkyl, lower alkenyl and lower alkynyl are contemplated hydrocarbon radicals having preferably up to four carbon atoms, the alkynyl radicals having the triple bond stemming from the carbon adjacent to the steroid nucleus. Included are alkyl radicals such as methyl, ethyl, isopropyl, n-propyl, n-butyl and the like; alkenyl radicals such as ethenyl (vinyl), propenyl (allyl), and α-butenyl; and alkynyl radicals such as ethynyl, 1'-propynyl and 1'-butynyl.

Illustrative of the 3 and/or 17 acyloxy radicals contemplated are lower alkanoates such as acetate, propionate, butyrate, valerate, caproate and t-butylacetate; aryl esters such as benzoate and toluate; esters from dibasic organic acids such as succinate, phthallate and sulfobenzoates; and those from polybasic inorganic acids such as sulfate, phosphate and the like. Also included in the term acyloxy radical are alkali metal salts of dibasic organic acid esters and of polybasic inorganic acid esters, for example, 3-methoxy-16,16-difluoroestradiol 17-sodium succinate and 16,16-difluoroestrone 3-disodium phosphate, respectively.

My invention therefore relates to compounds such as 16,16 - difluoroestrone (16,16-difluoro-1,3,5(10)-estratriene-3-ol-17-one), 16,16-difluoroestradiol (16,16-difluoro-1,3,5(10) - estratriene - 3,17β-diol), 16,16-difluoro-17α-methylestradiol (16,16 - difluoro - 17α-methyl-1,3,5(10)-estratriene-3,17β-diol), 16,16-difluoro-17α-ethinylestradiol (16,16 - difluoro-17α-ethinyl-1,3,5(10)-estratriene-3,17β-diol) and to 3-lower alkyl ethers such as 3-methoxy- and 3 - ethoxy - 16,16-difluoro-1,3,5(10)-estratriene-17-one, 3-methoxy - 16,16 - difluoro-17α-methyl-1,3,5(10)-estratriene - 17β - ol, 3-methoxy-16,16-difluoro-17α-ethinyl-1,3,5- (10)-estratriene-17β-ol, and 3-methoxy-16,16-difluoro-1,3,5,(10)-estratriene-17β-ol. Also included are mono-esters such as 16,16-difluoroestrone 3-acetate (16,16-difluoro1,3,5(10)-estratriene-3-ol-17-one 3-acetate), 16,16-difluoroestrone 3-benzoate, 16,16-difluoro-17α-methyl-1,3,5(10)-estratriene - 3,17β-diol 17-acetate, 16,16-difluoro-1,3,5-(10)-estratriene-3,17β-diol 3-acetate, 16,16-difluoro-17α-ethinyl - 1,3,5(10) - estratriene-3,17β-diol 3-benzoate, 3-methoxy - 16,16-difluoro-1,3,5(10)-estratriene-17β-ol 17-hemisuccinate, 3-methoxy-16,16-difluoro-1,3,5(10)-estratriene-17β-ol 17-phosphate; and diesters such as 16,16-difluoro-1,3,5(10)-estratriene-3,17β-diol dibenzoate, 16,16-difluoro-1,3,5(10)-estratriene-3,17β-diol 3-acetate 17-benzoate, 16,16-difluoro-17α-ethinyl-1,3,5(10)-estratriene-3,17β-diol 3-benzoate 17-acetate and 16,16-difluoro-1,3,5-(10)-estratriene-3,17β-diol diacetate.

My novel compounds are therapeutically active as described herein. In general, the 3-lower alkyl ethers of the generic formula are more therapeutically valuable than are the 16,16-difluoroestratrienes having a free hydroxyl or an acyloxy group at the 3-carbon. In particular, the 3-methyl ethers are the preferred species and specifically, 3-methoxy-16,16-difluoro-1,3,5(10)-estratriene-17 - one, 3 - methoxy-16,16-difluoro-1,3,5(10)-estratriene-17β - ol, 3-methoxy-16,16-difluoro-17α-methyl-1,3,5(10)-estratriene - 17β - ol and 3-methoxy-16,16-difluoro-17α-ethinyl-1,3,5(10)-estratriene-17β-ol.

My novel compounds are conveniently prepared from a precursor containing no other substituent in the D-ring except a 17-keto function (for example, estrone benzoate or a lower alkyl ether of estrone such as 3-methoxy-1,3, 5(10)-estratriene 17-one) by utilizing the novel process described in copending application of Robinson, Serial No. 7,107, filed February 8, 1960. According to this process an estratriene having a ketone function at C–17, for example, 3-methoxyestrone is converted to the intermediary 16-hydroxymethylene or 16-ethoxalyl derivative by methods well known in the art. I prefer to formulate the activated C–16 position by reacting 3-methoxyestrone, for example, with ethyl formate and sodium methoxide or sodium hydride utilizing as solvent, benzene or tetrahydrofuran or mixtures thereof. The 16-formyl derivative thereby obtained, i.e., 3-methoxy-16-hydroxymethylene-1,3,5(10)-estratriene-17-one exists in two tautomeric forms, namely formyl and hydroxymethylene. Alternatively, the 16-ethoxalyl derivatives of estrone, estrone benzoate or 3-methoxyestrone are prepared according to procedures similar to those for preparing the 16-hydroxymethylene derivatives by using ethyl oxalate as reagent instead of ethyl formate, yielding derivatives which also exist in two tautomeric forms (keto and enol), the keto derivatives being 16-ethoxalylestrone, 16-ethoxalylestrone benzoate and 3-methoxy-16-ethoxalylestrone, respectively, and the respective enol forms being 16-(1'-hydroxy-1'-carbethoxy)methyleneestrone, 16-(1'-hydroxy-1'-carbethoxy)methyleneestrone 3-benzoate, and 3-methoxy-16-(1'-hydroxy-1'-carbethoxy)methyleneestrone.

By reacting an intermediary 16-hydroxymethyleneestratriene (16-formylestratriene) or 16-(1'-hydroxy-1'-carbethoxy)methyleneestratriene (16-ethoxalylestratriene), for example, 3-methoxy-16-hydroxymethylene-1,3,5(10)-estratriene-17-one, with perchloryl fluoride in the presence of alkoxide, preferably potassium t-butoxide in t-butanol solvent, there is obtained the corresponding 16,16-difluoroestratriene, e.g., 3-methoxy-16,16-difluoro-1,3, 5(10)-estratriene-17-one, a novel compound of my invention.

The novel 3-methoxy-16,16-difluoro-1,3,5(10)-estratriene-17-one, prepared as described above, may be transformed to the 17α-lower alkynyl-17β-hydroxy or 17α-lower alkyl-17β-hydroxy analogs by known methods. For example, 3-methoxy-16,16-difluoro-1,3,5(10)-estratriene- 17-one is readily transformed to 3-methoxy-16,16-difluoro-17α-methyl-1,3,5(10)-estratriene-17β-ol by the well known Grignard reagent utilizing methyl magnesium iodide, or is transformed to the corresponding 17α-ethinyl compound by means of sodium or potassium acetylide. The 17-keto compound, e.g. 3-methoxy-16,16-difluoro-1,3,5(10)-estratriene-17-one is reduced to the 17β-hydroxy analog (3-methoxy-16,16-difluoro-1,3,5(10)-estratriene-17β-ol) by hydrogenation with lithium aluminum hydride, sodium borohydride, platinum-hydrogen and the like.

By substituting suitable reagents in the aforementioned reactions such as ethyl magnesium bromide instead of methyl magnesium iodide in the Grignard reaction on 3-methoxy-16,16-difluoro-1,3,5(10)-estratriene-17-one there are obtained higher homologs at C–17 for example, 3-methoxy-16,16-difluoro - 17α - ethyl-1,3,5(10)-estratriene-17β-ol. Similarly, to prepare C–17 homologs of 3-methoxy-16,16-difluoro - 17α - ethinyl - 1,3,5(10) - estratriene-17β-ol for example, it is preferred to substitute sodium or potassium methyl acetylide for sodium acetylide in the alkynylation reaction to obtain the corresponding 17α-(1'-propynyl) analog. When sodium ethylacetylide is used in the aforementioned reaction there is obtained the corresponding 17α-butynyl compound, i.e. 3-methoxy-16,16-difluoro-17α-(1'-butynyl) - 1,3,5(10) - estratriene-17β-ol. Alternatively, it is possible to obtain higher 17α-alkynyl homologs of my 17α-ethinyl compounds by alkylating the active hydrogen on the ethinyl moiety by means of lithium and methyl or ethyl iodide, for example, to obtain the corresponding 17α-(1'-propynyl) or 17α-(1'-butynyl) compound.

The 16,16-difluoro-17α-alkenylestratrienes of the general formula are conveniently prepared from the corresponding 16,16-difluoro-17α-alkynylestratrienes by reduction with hydrogen in the presence of pallidized strontium carbonate catalyst. For example, 3-methoxy-16,16-difluoro-17α-ethynyl - 1,3,5(10) - estratriene-17β-ol and 3-methoxy - 16,16 - difluoro-17α-(1'-propynyl)-1,3,5(10)-estratriene-17β-ol upon reduction yields 3-methoxy-16,16-difluoro-17α-vinyl - 1,3,5(10) - estratriene-17β-ol and 3-methoxy - 16,16 - difluoro-17α-(1'-propynyl)-1,3,5(10)-estratriene-17β-ol, respectively.

When preparing the novel 16,16-difluoroestratrienes having a free hydroxy group at the 3-carbon it is preferred to introduce the 16,16-difluoro moiety into a 3-alkyloxy derivative of estrone and then hydrolyze the alkoxy group to hydroxy by known techniques such as that utilizing hydroiodic acid in the presence of acetic acid, or hydroiodic acid together with an inert solvent such as dioxane. Alternatively, estrone 3-benzoate is converted to 16,16-difluoroestrone 3-benzoate which, in turn, is hydrolyzed by means of methanolic potassium hydroxide to 16,16-difluoroestrone.

My novel 3,17-dihydroxy-16,16-difluoroestratrienes are obtained from 16,16-difluoroestrone by procedures analogous to those described above for the 3-methoxy compounds of my invention. Alternatively, the 3,17-diols of the general formula may be obtained from the corresponding 3-methoxy derivative by hydrolyzing the ether group at the 3-carbon as described heretofore. For example, 16,16-difluoro-17α-methyl-1,3,5(10)-estratriene-3,17β-diol is prepared from 16,16-difluoroestrone by utilizing the Grignard reagent methyl magnesium iodide, or, alternatively is prepared from 3-methoxy-16,16-difluoro-17α-methyl-1,3,5(10)-estratriene - 17β - ol by hydrolysis with hydroiodic acid in the presence of acetic acid.

The 3-alkyloxy-16,16-difluoroestratrienes of the general formula possessing an ester group at C–17 are conveniently prepared by known techniques from the corresponding 3 - alkyloxy - 17β - hydroxy - 16,16 - difluoroestratriene by esterification with pyridine and an acid anhydride. For example, 3-methoxy-16,16-difluoro-17α-methyl-1,3,5(10)-estratriene-17β-ol when heated with acetic anhydride in pyridine yields the 17-acetate, i.e. 3 - methoxy - 16,16 - difluoro - 17α - methyl - 1,3,5(10)-estratriene-17β-ol 17-acetate. By substituting other lower alkanoic acid anhydrides such as propionic anhydride or caproic anhydride; or a dicarboxylic acid anhydride such as succinic or phthalic anhydride; or acid halides of aryl carboxylic acids such as benzoyl chloride, the corresponding 17-ester is obtained, i.e. the 17-propionate, 17-caproate, 17-succinate, 17-phthalate and 17-benzoate respectively of 3-methoxy-16,16-difluoro-17α-methyl-1,3,5(10)-estratriene-17β-ol.

The inorganic acid esters of my novel 16,16-difluoroestratrienes are also prepared in pyridine utilizing known techniques. For example, 3-methoxy-16,16-difluoroestradiol in pyridine upon reaction with phosphorous oxychloride yields 3-methoxy-16,16-difluoroestradiol 17-phosphate. An alkali metal salt of the foregoing ester such as the disodium salt is then conveniently prepared by reaction of the phosphate ester with sodium hydroxide to give 3-methoxy-16,16-difluoroestradiol 17-disodium phosphate.

When preparing 3,17-diesters of the general formula, the corresponding 3,17-diol is preferably reacted in pyridine with at least two moles of an acid anhydride or two moles of an acid chloride per mole of steroid. Usually an excess of acid anhydride or acid halide is used, and it is often desirable to apply heat to hasten the esterification process. For example, 16,16-difluoro-1,3,5(10)-estratriene-3,17β-diol dibenzoate is obtained from 16,16-difluoroestradiol by reaction with a two molar excess of benzoyl chloride.

Those compounds of my invention possessing an ester group at the 3-position and a secondary hydroxyl at the 17-position, for example, estradiol 3-acetate are conveniently prepared by known techniques from the corresponding 3-acyloxy-17-one, i.e. estrone 3-acetate by reduction with hydrogen utilizing platinum oxide as catalyst. The 3-acyloxy-16,16-difluoroestratriene possessing a tertiary hydroxyl at C–17 are conveniently prepared from the corresponding 3,17 - dihydroxy-16,16-difluoroestratrienes by selective esterification at C–3 with pyridine and a lower alkanoyl anhydride, or with pyridine and an acid chloride of an aryl carboxylic acid such as benzoyl chloride. For example, 16,16-difluoro-17α-methyl-1,3,5(10)-estratriene-3,17β-diol reacted with approximately a molar equivalent of acetic anhydride in pyridine yields the 3-monoacetate, i.e. 16,16-difluoro-17α-methyl-1,3,5(10)-estratriene-3,17β-diol 3-acetate. Similarly, reaction with approximately a molar equivalent of benzoyl chloride in pyridine yields the 3-monobenzoate, i.e. 16,16-difluoro-17α-methyl-1,3,5(10)-estratriene-3,17β-diol 3-benzoate.

By varying reaction conditions and utilizing a combination of known techniques there are obtained compounds of the general formula having dissimilar ester groups at C–3 and C–17. For example, reaction of a 3-acyloxy-16,16-difluoro-17α-hydroxyestratriene with an acid anhydride or acid halide having an acid radical other than that at the 3-position, such as the reaction of 16,16-difluoro - 17α - methyl - 1,3,5(10) - estratriene - 3,17β-diol 3-benzoate with acetic anhydride in pyridine at elevated temperatures, will yield the mixed 3,17-diester, 16,16 - difluoro - 17α - methyl - 1,3,5(10) - estratriene-3,17β-diol 3-benzoate 17-acetate.

A 3,17-diol of the general formula possessing an ester group at 17 such as 16,16-difluoro-17α-methyl-1,3,5(10)-estratriene-3,17β-diol and 17-acetate and 16,16-difluoroestradiol 17-acetate is conveniently prepared by known techniques from the corresponding diester 16,16-difluoro-17α-ethyl-1,3,5(10)-estratriene-3,17β-diol diacetate and 16,16-difluoroestradiol diacetate by partial hydrolysis such as with 5% potassium hydroxide or 1% potassium carbonate in methanol, respectively.

The novel 16,16-difluoroestratrienes of the general formula, and particularly the 3-lower alkyl ethers, are therapeutically valuable in that they exhibit low estrogenic activity in conjunction with a strong lipid-shifting effect (i.e. in addition to lowering serum cholesterol they cause a reduction in serum phospholipids as well). This combination of properties (i.e. low estrogenic-high lipid-shifting), renders my novel compounds valuable in the treatment and prevention of conditions such as arteriosclerosis which are caused by abnormal cholesterol metabolism and deposition. It is known that estratrienes such as estrone and estradiol also possess this lipid effect. However, these compounds are also potent estrogens, and the strong estrogenic side effects of these compounds renders them impractical for the long term therapy necessary when treating degenerate diseases such as arteriosclerosis. My novel 16,16-difluoroestratrienes on the other hand, surprisingly possess a minimum of estrogenic activity while retaining a strong lipid-shifting effect. This is clearly demonstrated by the ratio of the lipid-shifting effect to the estrogenic effect, which in my novel compounds is dramatically increased over the corresponding ratios characteristic of the natural estrogenic hormones. For example, 16,16-difluoroestrone 3-methyl ether exhibits approximately the same lipid-shifting effect as estradiol in the rat while exhibiting merely about 0.05% of the estrogenic activity of estradiol as measured by the mouse uterine assay. Thus, the ratio of lipid-shifting activity to estrogenic activity as compared to the same ratio for estradiol is about 2,000 to 1.

In addition to the foregoing, my fluorinated estratrienes possess the added advantage of being long acting. For example, it has been observed that 3-methoxy-16,16-difluoroestrone causes a lowering of serum cholesterol in the rat for longer periods of time than does estradiol. By exhibiting extended pharmacological activity in conjunction with a minimum of undesirable side effects my compounds are rendered valuable therapeutic agents.

In addition to being therapeutically valuable per se, my novel 16,16-difluoroestratrienes are useful as intermediates in the preparation of other pharmacologically active steroids such as the 16,16-difluoro-19-nor-4-androstenes described in copending application, Serial No. 7,107, filed February 8, 1960. For example, 3-methoxy-16,16-difluoro-1,3,5(10)-estratriene-17β-ol upon reduction with lithium in ammonia according to known techniques yields 3 - methoxy - 16,16 - difluoro - 2,5(10) - estradiene-17β-ol which upon subsequent treatment with a strong acid such as hydrochloric is converted to 16,16-difluoro-19-nor-4-androstene-17β-ol-3-one. Alternatively, when 3 - methoxy - 16,16 - difluoro - 2,5(10) - estradiene-17β-ol is treated with a weak acid such as oxalic acid there is obtained 16,16-difluoro-5(10)-androstene-17β-ol-3-one which is convertible upon hydrochloric acid treatment to the therapeutically active 4-dehydro isomer, 16,16 - difluoro - 19 - nor - 4 - androstene - 17β - ol - 3-one. Conversion of the 17β-hydroxyl group to the 17-keto function is effected by chromic acid oxidation.

The 16,16 - difluoro - 17 - keto - 19 - nor - 4 - androstene-3-one thus obtained when subjected to reactions similar to those described hereinabove for the 16,16-difluoro-17-ketoestratrienes of this invention, is convertible to the corresponding 17α-methyl-17β-hydroxy-, and the 17α-ethinyl - 17β - hydroxy - 16,16 - difluoro - 19 - nor - 4-androstene-3-one.

The following examples are shown by way of illustration only and are not to be construed as limiting the scope thereof, the scope of my invention being defined by the appended claims.

The present application is a continuation-in-part of my copending application, Serial No. 7,124, filed February 8, 1960.

EXAMPLE 1

*3-Methoxy-16,16-Difluoro-1,3,5(10)-Estratriene-17-One*

A. *3 - methoxy - 16 - hydroxymethylene - 1,3,5(10)-estratriene-17-one.*—To a stirred solution of 25 g. of 3-methoxy-1,3,5(10)-estratriene-17-one in 600 ml. of tetrahydrofuran under an atmosphere of nitrogen, there is first added 25 g. of sodium methoxide and then, over a 30 minute period, 200 ml. of ethyl formate. The reaction mixture is stirred under nitrogen for 18 hours at room temperature, then is poured into water. The resulting solution is acidified with 6 N aqueous hydrochloric acid. A solid precipitates which is filtered off and dried in vacuo to give substantially 3-methoxy-16-hydroxymethylene-1,3,5(10)-estratriene-17-one, $$\lambda_{max.}^{MeOH}\ 268\ m\mu\ (\epsilon\ 10,500)$$

which is used without further purification in the following procedure.

B. *3 - methoxy - 16,16 - difluoro - 1,3,5(10) - estratriene-17-one.*—To 4.2 g. of 3-methoxy-16-hydroxymethylene-1,3,5(10)-estratriene-17-one dissolved in 450 ml. of t-butanol, there is added 85 ml. of a molar solution of potassium t-butoxide in t-butanol. Perchloryl fluoride gas is then bubbled through this stirred solution under nitrogen for 90 minutes at room temperature. The reaction mixture is diluted with 2 l. of water and extracted with methylene chloride. The extracts are combined, washed with water, dried over magnesium sulfate and evaporated in vacuo. The resultant residue is chromatographed on Florisil and eluted with hexane-ether mixtures. The hexane-ether eluates ranging in concentration from 7:3 to 1:1 are combined and crystallized from ether-hexane to give 3-methoxy-16,16-difluoro-1,3,5(10)-estratriene-17-one, M.P. 126–128° C., [α]$_D$ +167°, $$\lambda_{max.}^{Nujol}\ 5.63\mu$$

EXAMPLE 2

*3-Methoxy-16,16-Difluoro-1,3,5(10)-Estratriene-17β-ol*

300 mg. of sodium borohydride is added to a solution of 170 mg. of 3-methoxy-16,16-difluoro-1,3,5(10)-estratriene-17-one (the compound of Example 1) in 14 ml. of isopropanol. The reaction mixture is refluxed for one hour then cooled and diluted with water. The resultant solid is filtered, washed with water, dried and crystallized from aqueous methanol to give 3-methoxy-16,16 - difluoro - 1,3, 5(10) - estratriene - 17β - ol, M.P. 123–127° C., [α]$_D$ +71°.

EXAMPLE 3

*3-Methoxy-16,16-Difluoro-17α-Ethinyl-1,3,5(10)-Estratriene-17β-ol*

To a stirred solution of 500 mg. of 3-methoxy-16,16-difluoro-1,3,5(10)-estratriene-17-one in 7 ml. of dimethylsulfoxide, there is added sodium acetylide (obtained from 4 ml. of a 17% suspension of sodium acetylide in xylene by centrifuging and removing the supernatant liquid) in 5 ml. of dimethylsulfoxide. The reaction mixture is stirred at room temperature for 45 minutes, then diluted with ice and water. A solid separates which is filtered, washed with water, dried and crystallized from acetone-hexane to give 3-methoxy-16,16-difluoro-17α-ethinyl-1,3,5(10)-estratriene-17β-ol, M.P. 140–142° C. [α]$_D$ +20°.

In a similar manner by substituting sodium methyl acetylide for sodium acetylide in the above procedure, there is obtained 3-methoxy-16,16-difluoro-17α-propynyl-1,3,5(10)-estratriene-17β-ol.

EXAMPLE 4

*3-Methoxy-16,16-Difluoro-17α-Methyl-1,3,5(10)-Estratriene-17β-ol*

To a stirred solution of methyl magnesium iodide (derived from 1.5 g. of magnesium and 4 ml. of methyl iodide) in 100 ml. of ether under an atmosphere of nitrogen, there is added 500 mg. of 3-methoxy-16,16-difluoro-1,3,5(10)-estratriene-17-one (the compound of Example 1) in 25 ml. of tetrahydrofuran. An additional 75 ml. of tetrahydrofuran is added and the ether is distilled out of the reaction mixture. The remaining mixture is then refluxed for one hour, then cooled and added cautiously to a mixture of ice and water. The aqueous mixture is extracted with methylene chloride. The extracts are combined, washed with water, dried over magnesium sulfate and evaporated in vacuo to a residue which is chromatographed over Florisil. Benzene-ether eluates ranging in concentration from 1:1 to 1:9 are combined and evaporated to a residue which is crystallized from ethyl acetate-methanol to give 3-methoxy-16,16-difluoro-17α-methyl-1,3,5(10)-estratriene-17β-ol, M.P. 137–142° C.

In a similar manner by substituting other alkyl Grignard reagents such as ethyl magnesium iodide and n-propyl magnesium bromide for methyl magnesium iodide in the above procedure, there is obtained 3-methoxy-16,16 - difluoro - 17α - ethyl - 1,3,5(10) - estratriene - 17β-ol and 3-methoxy-16,16-difluoro-17α-n-propyl-1,3,5(10)-estratriene-17β-ol, respectively.

EXAMPLE 5

*3-Methoxy-16,16-Difluoro-1,3,5(10)-Estratriene-17β-ol 17-Acetate*

To one gram of 3-methoxy-16,16-difluoro-1,3,5(10)-estratriene-17β-ol (the compound of Example 2) in 10 ml. of pyridine is added 2 ml. of acetic anhydride. The solution is left overnight at room temperature. Water is added and the aqueous mixture extracted with ether. The ether extracts are combined, washed with 2 N hydrochloric acid, then water, dried over sodium sulfate, filtered and distilled in vacuo to give a residue substantially of 3-methoxy - 16,16 - difluoro - 1,3,5(10) - estratriene - 17β-ol 17-acetate.

Similarly, by substituting other lower alkanoic acid anhydrides such as propionic, valeric or caproic for acetic anhydride in the above procedure, there is obtained the corresponding 17-propionate, 17-valerate and 17-caproate respectively of 3-methoxy-16,16-difluoro-1,3,5(10)-estratriene-17β-ol.

EXAMPLE 6

*The 17-Acetate Ester of 3-Methoxy-16,16-Difluoro-17α-Ethinyl-1,3,5(10)-Estratriene-17β-ol and 3-Methoxy-16,16 - Difluoro - 17α - Methyl-1,3,5(10)-Estratriene-17-β-ol*

To one gram of 3-methoxy-16,16-difluoro-17α-ethinyl-1,3,5(10)-estratriene-17β-ol (the compound of Example 3) in 10 ml. of pyridine is added 2 ml. of acetic anhydride. The reaction mixture is heated on the steam bath for 48 hours, then cooled. Water is added and the aqueous mixture is extracted with ether. The extracts are combined, washed with 2 N hydrochloric acid, then water, dried over sodium sulfate and distilled in vacuo to give a residue substantially of 3-methoxy-16,16-difluoro-17α-ethinyl-1,3,5(10)-estratriene-17β-ol 17 acetate.

In the manner described above 3-methoxy-16,16-difluoro-17α-methyl-1,3,5(10)-estratriene-17β-ol (the compound of Example 4) is reacted with acetic anhydride in pyridine to give 3-methoxy-16,16-difluoro-17α-methyl-1,3,5(10)-estratriene-17β-ol 17-acetate.

Similarly by substituting other lower alkanoic acid anhydrides such as propionic, valeric or caproic for acetic anhydride in the above procedures, there is obtained the corresponding 17-propionate, 17-valerate and 17-caproate respectively of 3-methoxy-16,16-difluoro-17α-ethinyl-1,3,5(10)-estratriene-17β-ol and of 3-methoxy-16,16-difluoro-17α-methyl-1,3,5(10)-estratriene-17β-ol.

EXAMPLE 7

*16,16-Difluoro-1,3,5(10)-Estratriene-3-Ol-17-One*

A solution of 1 g. of 3-methoxy-16,16-difluoro-1,3,5(10)-estratriene-17-one in 10 ml. of glacial acetic acid and 2.5 ml. of constant boiling aqueous hydroiodic acid (density 1.5) is refluxed for two minutes. The solution is cooled, poured into 10% aqueous sodium bisulfite solution, then there is added 10% aqueous sodium hydroxide solution. The reaction mixture is filtered, the filtrate brought to neutrality with acetic acid, then extracted with ether. The ether extracts are combined, washed with water, dried over sodium sulfate and evaporated in vacuo to a residue substantially of 16,16-difluoro-1,3,5(10)-estratriene-3-ol-17-one.

Similarly, 3 - methoxy-16,16-difluoro-1,3,5(10)-estratriene-17β-ol (the compound of Example 2) is hydrolyzed with aqueous hydroiodic acid according to the above procedure to give 16,16-difluoro-1,3,5(10)-estratriene-3,17β-diol.

EXAMPLE 8

*16,16-Difluoro-17α-Methyl-1,3,5(10)-Estratriene-3,17β-Diol*

16,16 - difluoro - 1,3,5(10)-estratriene-3-ol-17-one (the compound of Example 7) is reacted with methyl magnesium iodide in the manner of Example 4. The resultant product is isolated and purified as described to give 16,16-difluoro-17α-methyl-1,3,5(10)-estratriene-3,17β-diol.

EXAMPLE 9

*16,16-Difluoro-17α-Ethinyl-1,3,5(10)-Estratriene-3,17β-Diol*

16,16 - difluoro - 1,3,5(10)-estratriene-3-ol-17-one (the compound of Example 7) is reacted with sodium acetylide in dimethylsulfoxide according to the procedure of Example 3. The resultant product is isolated and purified in the manner described to give 16,16-difluoro-17α-ethinyl-1,3,5(10)-estratriene-3,17β-diol.

EXAMPLE 10

*Preparation of 3-Alkanoyl Esters*

A solution of 1 g. of 16,16-difluoro-1,3,5(10)-estratriene-3-ol-17-one (the compound of Example 7) in 10 ml. of pyridine and 2 ml. of acetic anhydride is left overnight at room temperature. Water is added and the aqueous mixture extracted with ether. The ether extracts are combined, washed with 2 N hydrochloric acid, then water, dried over sodium sulfate, filtered and distilled in vacuo to give a residue substantially of 16,16-difluoro-1,3,5(10)-estratriene-3-ol-17-one 3-acetate.

In a similar manner, 16,16-difluoro-17α-methyl-1,3,5(10)-estratriene-3,17β-diol and 16,16-difluoro-17α-ethinyl-1,3,5(10)-estratriene-3,17β-diol are each reacted with acetic anhydride in pyridine to give respectively, 16,16-difluoro - 17α - methyl-1,3,5(10)-estratriene-3,17β-diol 3-acetate and 16,16-difluoro-17α-ethinyl-1,3,5(10)-estratriene-3,17β-diol 3-acetate.

By substituting other acid anhydrides such as propionic, valeric and t-butylacetic anhydride for acetic anhydride in the above procedures there are obtained the corresponding propionate, valerate and t-butylacetate of the aforementioned compounds.

EXAMPLE 11

*Preparation of 3-Benzoic Acid Esters*

To one gram of 16,16-difluoro-1,3,5(10)-estratriene-3-ol-17-one (the compound of Example 7) in 10 ml. of pyridine is added 2 ml. of benzoyl chloride. The solution is left at room temperature for 24 hours, water is added and the aqueous mixture extracted with ether. The ether extracts are combined, washed with 2 N hydrochloric acid, then water, dried over sodium sulfate, filtered and distilled in vacuo to give a residue substantially of 16,16-difluoro-1,3,5(10)-estratriene-3-ol-17-one 3-benzoate.

In a similar manner, 16,16-difluoro-17α-methyl-1,3,5(10)-estratriene-3,17β-diol and 16,16-difluoro-17α-ethinyl-1,3,5(10)-estratriene-3,17β-diol are each reacted with benzoyl chloride in pyridine to give respectively, 16,16-difluoro - 17β - methyl - 1,3,5(10)-estratriene-3,17β-diol 3-benzoate and 16,16-difluoro-17α-ethinyl-1,3,5(10)-estratriene-3,17β-diol 3-benzoate.

EXAMPLE 12

*16,16-Difluoro-17α-Methyl-1,3,5(10)-Estratriene-3,17β-Diol 3-Benzoate 17-Acetate*

One gram of 16,16-difluoro-17α-methyl-1,3,5(10)-estratriene-3,17β-diol 3-benzoate (prepared as described in Example 11) in 10 ml. of pyridine and 2 ml. of acetic anhydride is reacted in the manner described in Example 6. The resultant product is isolated as described to give 16,16-difluoro-17α-methyl-1,3,5(10)-estratriene-3,17β-diol 3-benzoate 17-acetate.

In a similar manner, 16,16-difluoro-17α-ethinyl-1,3,5(10)-estratriene-3,17β-diol 3-benzoate (prepared as described in Example 11) is reacted with pyridine and acetic anhydride to give 16,16-difluoro-17α-ethinyl-1,3,5(10)-estratriene-3,17β-diol 3-benzoate 17-acetate.

EXAMPLE 13

*Preparation of 3,17-Di-Lower Alkanoyl and 3,17-Dibenzoate Esters*

One gram of 16,16-difluoro-17α-methyl-1,3,5(10)-estratriene-3,17β-diol (the compound of Example 8) in 10 ml. of pyridine and 4 ml. of acetic anhydride is reacted in the manner described in Example 6 to give 16,16-difluoro-17α-methyl-1,3,5(10)-estratriene-3,17β-diol diacetate.

One gram of 16,16-difluoro-17α-methyl-1,3,5(10)-estratriene-3,17β-diol in 10 ml. of pyridine and 4 ml. of benzoyl chloride is reacted in the manner similar to that described in Example 6 to give 16,16-difluoro-17α-methyl-1,3,5(10)-estratriene-3,17β-diol dibenzoate.

In a similar manner, 16,16-difluoro-17α-ethinyl-1,3,5(10)-estratriene-3,17β-diol (the compound of Example 9) and 16,16-difluoro-1,3,5(10)-estratriene-3,17β-diol (prepared as in Example 7) are each reacted with acetic anhydride or benzoyl chloride in pyridine to give the respective di-esters, i.e., 16,16-difluoro-17α-ethinyl-1,3,5(10)-estratriene-3,17β-diol diacetate, 16,16-difluoro-1,3,5(10)-estratriene-3,17β-diol diacetate, 16,16-difluoro-17α-ethinyl-1,3,5(10)-estratriene-3,17β-diol dibenzoate and 16,16-difluoro-1,3,5(10)-estratriene-3,17β-diol dibenzoate.

EXAMPLE 14

*16,16-Difluoro-17α-Methyl-1,3,5(10)-Estratriene-3,17β-Diol 17-Acetate*

A solution of 1 g. of 16,16-difluoro-17α-methyl-1,3,5(10)-estratriene-3,17β-diol diacetate (prepared as described in Example 13) in 30 ml. of 5% potassium hydroxide in methanol is refluxed for one-half hour. The solution is cooled, diluted with water, then neutralized with dilute hydrochloric acid. A solid separates which is filtered, dried and crystallized from acetone-hexane to give 16,16-difluoro-17α-methyl-1,3,5(10)-estratriene-3,17β-diol 17-acetate.

EXAMPLE 15

*Alternate Procedure for the Preparation of 3-Methoxy-16,16-Di-Fluoro-1,3,5(10)-Estratriene-17-One*

A. *3 - methoxy - 16 - (1' - hydroxy - 1' - carbomethoxy)methylene-1,3,5(10)-estratriene-17-one (3-methoxy-16 - ethoxyalyl - 1,3,5(10) - estratriene - 17 - one).*—To a stirred solution of 10 g. of sodium methoxide in 60 ml. of ethyl oxalate and 60 ml. of benzene under an atmosphere of nitrogen, there is added dropwise a solution containing 10 g. of 3-methoxy-1,3,5(10)-estratriene-17-one in 500 ml. of benzene and 100 ml. of tetrahydrofuran. The mixture is stirred under nitrogen at room temperature for 18 hours. The reaction mixture is then poured into 300 ml. of water with stirring and neutralized with 6 N hydrochloric acid. A solid separates which is filtered, washed with water and dried to give 3-methoxy-16-(1'-hydroxy - 1' - carbethoxy)methylene - 1,3,5(10)- estratriene-17-one (3-methoxy-16-ethoxalyl-1,3,5(10)-estratriene-17-one), which is used without further purification in the following procedure.

B. *3-methoxy - 16,16 - difluoro - 1,3,5(10) - estratriene - 17 - one.*—3 - methoxy - 16 - (1' - hydroxy - 1' - carbethoxy)methylene - 1,3,5(10) - estratriene - 17 - one (3-methoxy-16-ethoxalyl-1,3,5(10)-estratriene-17-one) is reacted with perchloryl fluoride in t-butanol in the presence of potassium t-butoxide in the manner of Example 1B. The resultant product is isolated and purified as described to give 3-methoxy-16,16-difluoro-1,3,5(10)-estratriene-17-one.

EXAMPLE 16

*3-Methoxy-16,16-Difluoro-17α-(1'-Propynyl)-1,3,5(10)-Estratriene-17β-Ol*

To a stirred solution of 1 g. of 3-methoxy-16,16-difluoro-1,3,5(10)-estratriene-17-one (the compound of Example 1) in 10 ml. of toluene under an atmosphere of nitrogen is added a solution of potassium butoxide (prepared from 1 g. of potassium and 14 ml. of t-butanol). The solution is cooled to room temperature, stirred for one hour and then methyl acetylene gas is passed over the solution for 8 hours, while maintaining the solution at room temperature. The reaction mixture is diluted with 2 N hydrochloric acid until strongly acid, then is extracted with toluene. The toluene extracts are combined, washed with water, dried over sodium sulfate and evaporated in vacuo to give 3-methoxy-16,16-difluoro-17α-(1'-propynyl)1,3,5(10)-estratriene-17β-ol.

EXAMPLE 17

*3-Methoxy-16,16-Difluoro-17α-Vinyl-1,3,5(10)-Estratriene-17β-Ol*

300 mg. of pre-reduced palladized strontium carbonate catalyst (15%) is added to a solution of 696 mg. of 3-methoxy - 16,16 - difluoro - 17α - ethinyl - 1,3,5(10) - estratriene-17β-ol (the compound of Example 3) in 100 ml. of pyridine. The mixture is stirred under an atmosphere of hydrogen until one mole of hydrogen per mole of steroid has been absorbed. The mixture is then filtered and the filtrate poured into 500 ml. of aqueous 10% hydrochloric acid, then the aqueous mixture extracted with ether. The ethereal extracts are combined, washed with 2 N hydrochloric acid, then with water and dried over sodium sulfate. The dried ethereal solution is evaporated to a residue which is crystallized from acetone-hexane to give 3-methoxy-16,16-difluoro-17α-vinyl-1,3,5(10)-estratriene-17β-ol.

In a similar manner, 3-methoxy-16,16-difluoro-17α-(1'-propynyl)-1,3,5(10)-estratriene-17β-ol (the compound of Example 16) is reduced according to the above-described procedure to give 3-methoxy-16,16-difluoro-17α-(1'-propenyl)-1,3,5(10)-estratriene-17β-ol.

EXAMPLE 18

*3-Ethoxy-16,16-Difluoro-1,3,5(10)-Estratriene-17-One*

To 1 g. of 16,16-difluoro-1,3,5(10)-estratriene-3-ol-17-one (the compound of Example 9) in 30 ml. of 10% ethanolic potassium hydroxide solution is added 3 ml. of diethyl sulfate over a two hour period (0.5 ml. portions every 20 minutes). The reaction mixture is stirred for 90 minutes, then diluted with 150 ml. of water. A solid results which is filtered, washed with water and dried to give 3-ethoxy-16,16-difluoro-1,3,5(10)-estratriene-17-one.

EXAMPLE 19

*3-Methoxy-16,16-Difluoro-1,3,5(10)Estratriene-17β-Ol 17-Hemisuccinate and the Sodium Salt Thereof*

A. *3 - methoxy - 16,16 - difluoro - 1,3,5(10) - estratriene-17β-hemisuccinate.*—To one gram of 3 - methoxy-16,16 - difluoro - 1,3,5(10) - estratriene-17β-ol (the compound of Example 2) in 10 ml. of pyridine is added one gram of succinic anhydride. The mixture is heated on a steam bath for one hour then cooled and diluted with water. A solid separates which is filtered, washed with water and dried to give 3-methoxy-16,16-difluoro-1,3,5(10)-estratriene-17β-ol 17-hemisuccinate.

B. *3 - methoxy - 16,16 - difluoro - 1,3,5(10) - estratriene-17β-ol 17-sodium hemisuccinate.*—To 1 g. of 3-methoxy-16,16-difluoro-1,3,5(10)-estratriene-17β-ol 17 - hemisuccinate suspended in 100 ml. of water is added 2.04 ml.

of a 10% aqueous solution of sodium hydroxide. The resultant aqueous solution is evaporated in vacuo to a residue of substantially 3-methoxy-16,16-difluoro-1,3,5(10)-estratriene-17α-ol 17-sodium hemisuccinate.

EXAMPLE 20

*Preparation of Phosphate Esters and the Disodium Salts Thereof*

A. *16,16-difluoro-1,3,5(10)-estratriene-3-ol-17-one 3-phosphate.*—A solution of 2 g. of 16,16-difluoro-1,3,5-(10)-estratriene-3-ol-17-one (the compound of Example 1) in 10 ml. of pyridine is added to 1.8 g. of phosphorous oxychloride in 10 ml. of pyridine at −10° C. The reaction mixture is stirred for one hour at −10° C., then poured slowly with stirring onto crushed ice. The resultant aqueous mixture is made alkaline with a saturated aqueous sodium bicarbonate solution and washed with ether. The aqueous solution is then acidified with hydrochloric acid. A solid precipitates which is filtered and dried to give 16,16-difluoro-1,3,5(10)-estratriene-3-ol-17-one 3-phosphate.

B. *3-methoxy-16,16-difluoro-1,3,5(10)-estratriene-17β-ol 17-phosphate.*—A solution of 2 g. of 3-methoxy-16,16-difluoro-1,3,5(10)-estratriene-17β-ol (the compound of Example 2) in pyridine is reacted with 1.7 g. of phosphorous oxychloride in 10 ml. of pyridine at −10° C. according to the procedure of Example 20A to give 3-methoxy - 16,16 - difluoro - 1,3,5(10) - estratriene - 17β-ol 17-phosphate.

C. *The disodium salt of compounds 20A and 20B.*—One gram of 16,16-difluoro-1,3,5(10)-estratriene-3-ol-17-one 3-phosphate is suspended in 100 ml. of water and 2.16 ml. of a 10% aqueous solution of sodium hydroxide is added with stirring. The resultant solution is then evaporated in vacuo to a residue substantially of 16,16-difluoro-1,3,5(10)-estratriene-3-ol-17-one 3-disodium phosphate.

Similarily, one gram of 3-methoxy-16,16-difluoro-1,3,5-(10)-estratriene-17β-ol 17-phosphate is reacted with 10% aqueous sodium hydroxide to give 3-methoxy-16,16-difluoro - 1,3,5(10) - estratriene - 17β - ol 17 - disodium phosphate.

EXAMPLE 21

*16,16-Difluoro-1,3,5(10)-Estratriene-3-Ol-17-One 3-Sulfate and the Potassium Salt Thereof*

A. *16,16-difluoro-1,3,5(10)-estratriene-3-ol-17-one 3-potassium sulfate.*—A mixture of 10 g. of 16,16-difluoro-1,3,5(10)-estratriene-3-ol-17-one (the compound of Example 1) and 10 g. of pyridine-sulphur trioxide complex in 100 ml. of pyridine is stirred for 2½ hours at room temperature. The mixture is then cooled in an ice bath and 10 ml. of 50% aqueous potassium hydroxide added rapidly with vigorous stirring. The mixture is stirred two minutes longer, then allowed to cool to room temperature without further stirring. The resultant two-phase system is centrifuged at room temperature and the pyridine layer decanted. The aqueous residue is washed with pyridine and the pyridine washes combined with the original pyridine layer. Ether is then added to the stirred pyridine solution until precipitation is complete. The mixture is then filtered and the residue dried to give substantially 16,16-difluoro-1,3,5(10)-estratriene-3-ol-17-one 3-potassium sulfate.

B. *16,16-difluoro-1,3,5(10)-estratriene-3-ol-17-one 3-sulfate.*—One gram of 16,16-difluoro-1,3,5(10)-estratriene-3-ol-17-one 3-potassium sulfate is dissolved in 100 ml. of water and the solution brought to neutrality by adding hydrochloric acid. A solid results which is filtered and dried to give 16,16-difluoro-1,3,5(10)-estratriene-3-ol-17-one 3-sulfate.

EXAMPLE 22

*16,16-Difluoro-1,3,5(10)-Estratriene-3,17β-Diol 3-Acetate*

One gram of 16,16-difluoro-1,3,5(10)-estratriene-3-ol-17-one 3-acetate (prepared as described in Example 10) is dissolved in 180 ml. of ethyl acetate and 0.25 g. of platinum oxide catalyst added. The mixture is reduced under an atmosphere of hydrogen at room temperature for 24 hours. The mixture is then filtered and the filtrate evaporated in vacuo to a residue which is crystallized from aqueous methanol of give 16,16-difluoro-1,3,5(10)-estratriene-3,17β-diol 3-acetate.

Ina similar manner, 16,16-difluoro-1,3,5(10)-estratriene-3-ol-17-one 3-benzoate (prepared as described in Example 11) is reduced with hydrogen using platinum oxide catalyst to give 16,16-difluoro-1,3,5(10)-estratriene-3,17β-diol 3-benzoate.

I claim:

3 - methoxy - 16 - (1' - hydroxy - 1' - carbethoxy)methylene - 1,3,5(10) - estratriene - 17 - one.

No references cited.